Oct. 9, 1962
P. H. DIXON
3,057,100
EXTRACTOR FOR AUTOMATIC GUNS
Filed Jan. 9, 1947
10 Sheets-Sheet 1
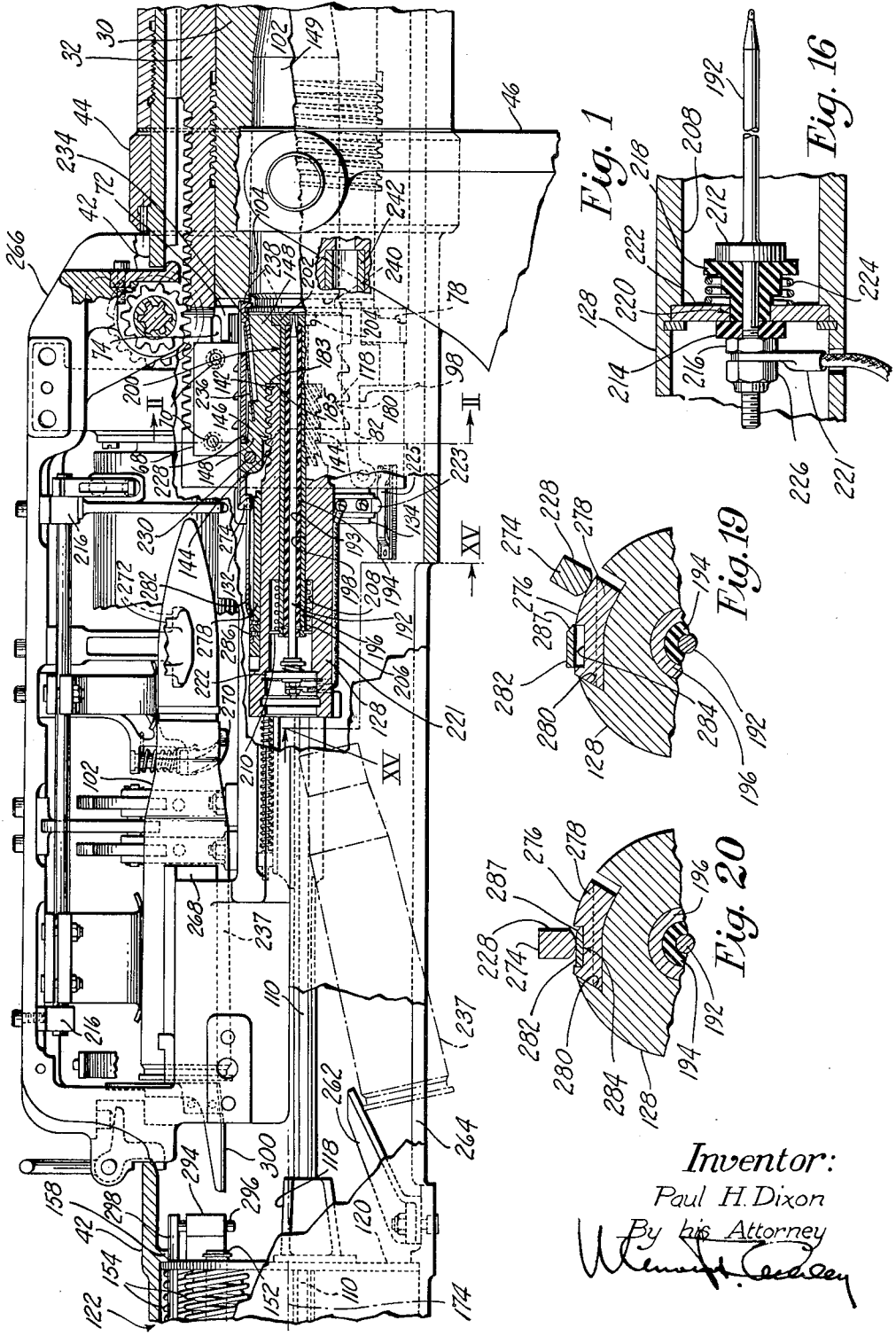
Inventor:
Paul H. Dixon
By his Attorney

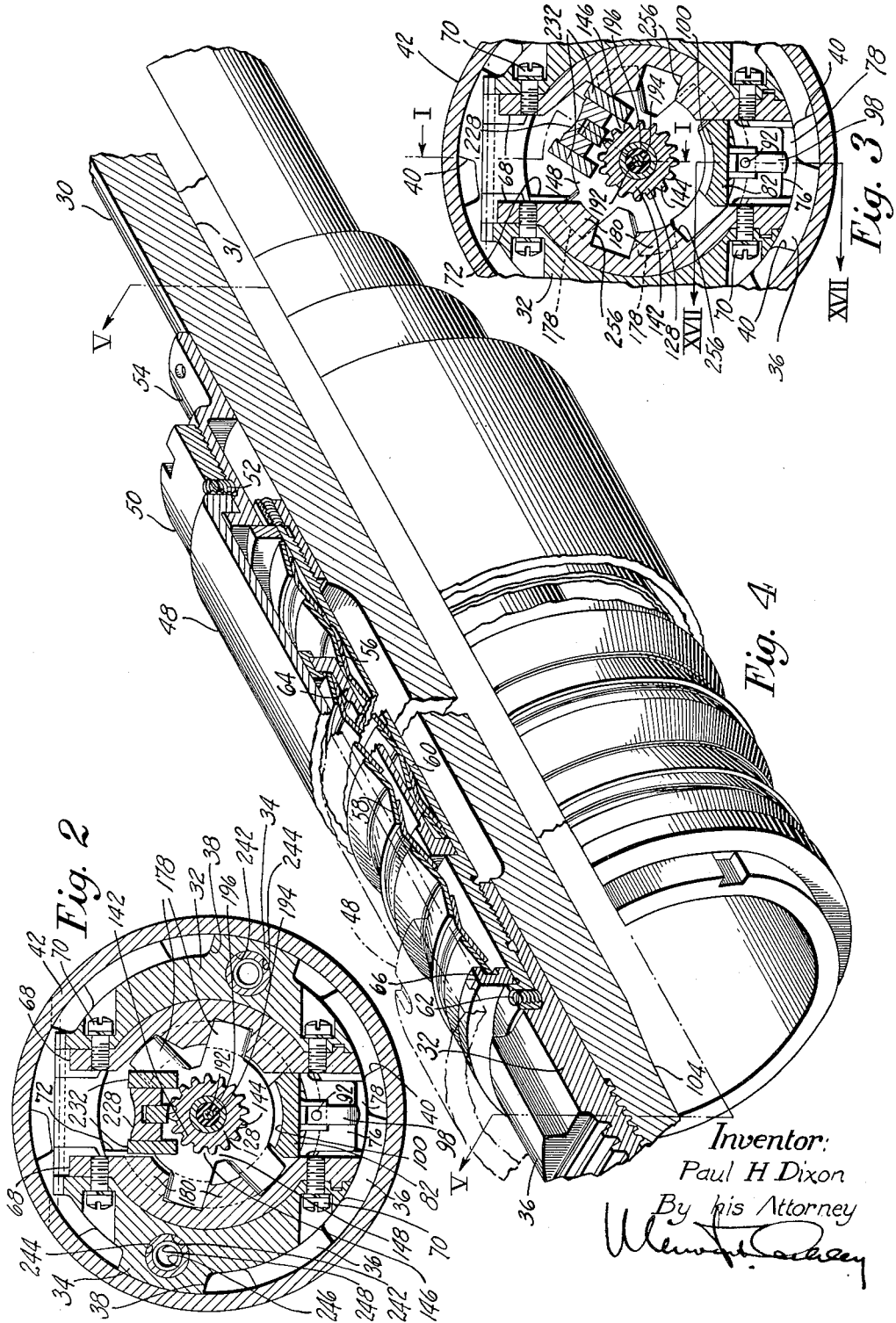

Oct. 9, 1962 P. H. DIXON 3,057,100
EXTRACTOR FOR AUTOMATIC GUNS
Filed Jan. 9, 1947 10 Sheets-Sheet 3
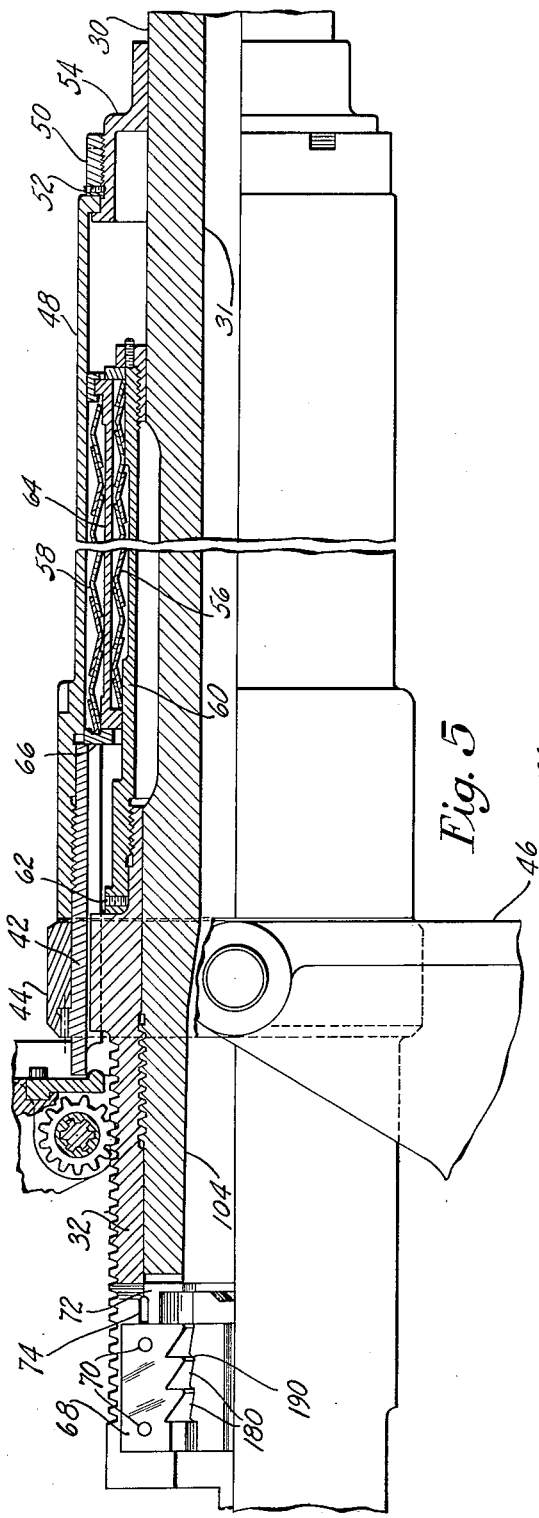
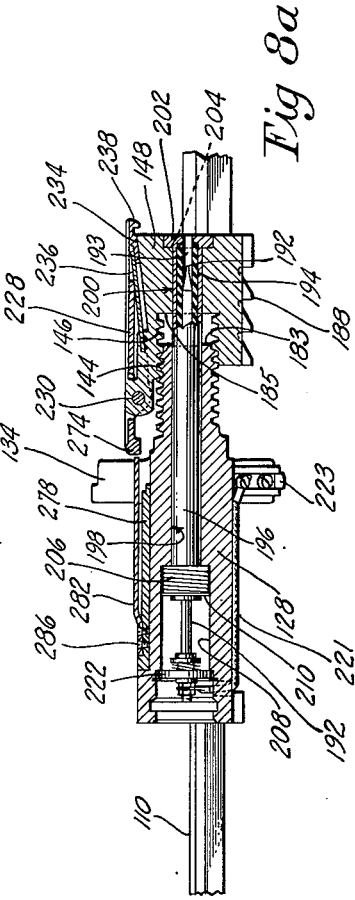
Inventor:
Paul H. Dixon
By his Attorney

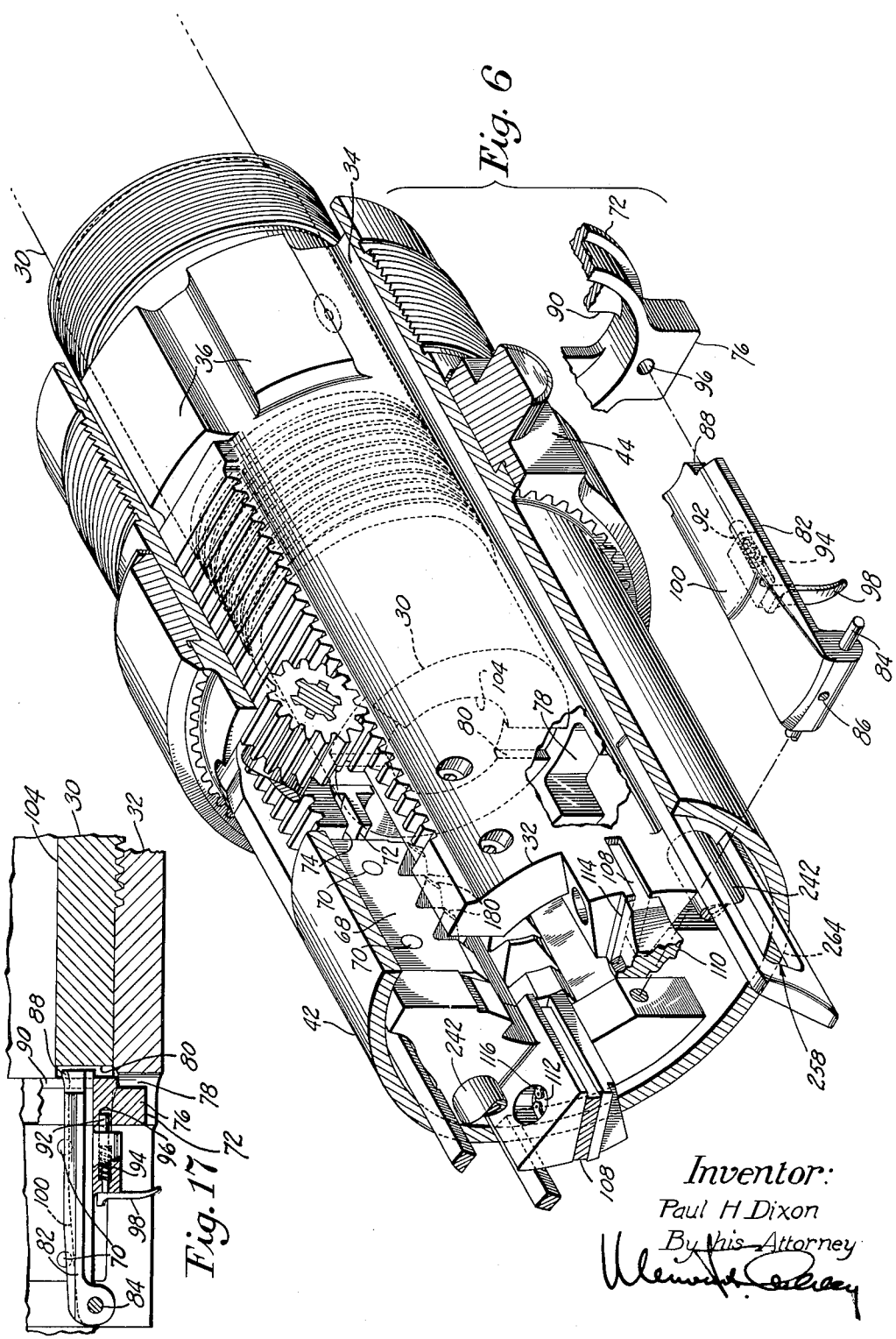

Oct. 9, 1962     P. H. DIXON     3,057,100
EXTRACTOR FOR AUTOMATIC GUNS
Filed Jan. 9, 1947     10 Sheets-Sheet 5
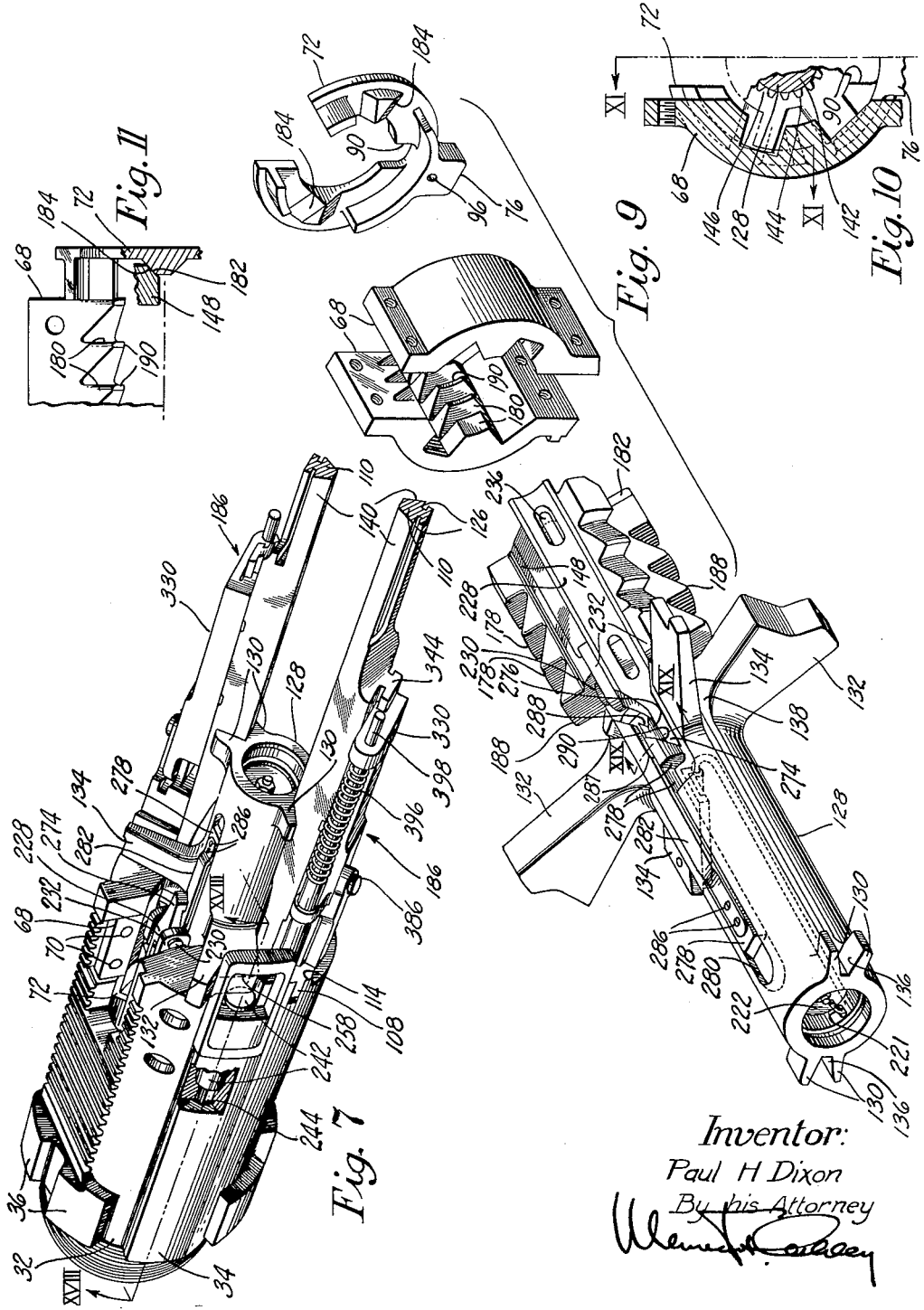
Inventor:
Paul H Dixon
By his Attorney

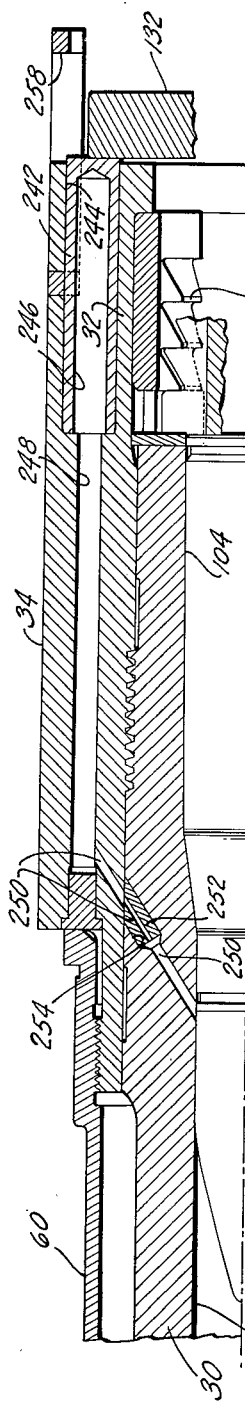

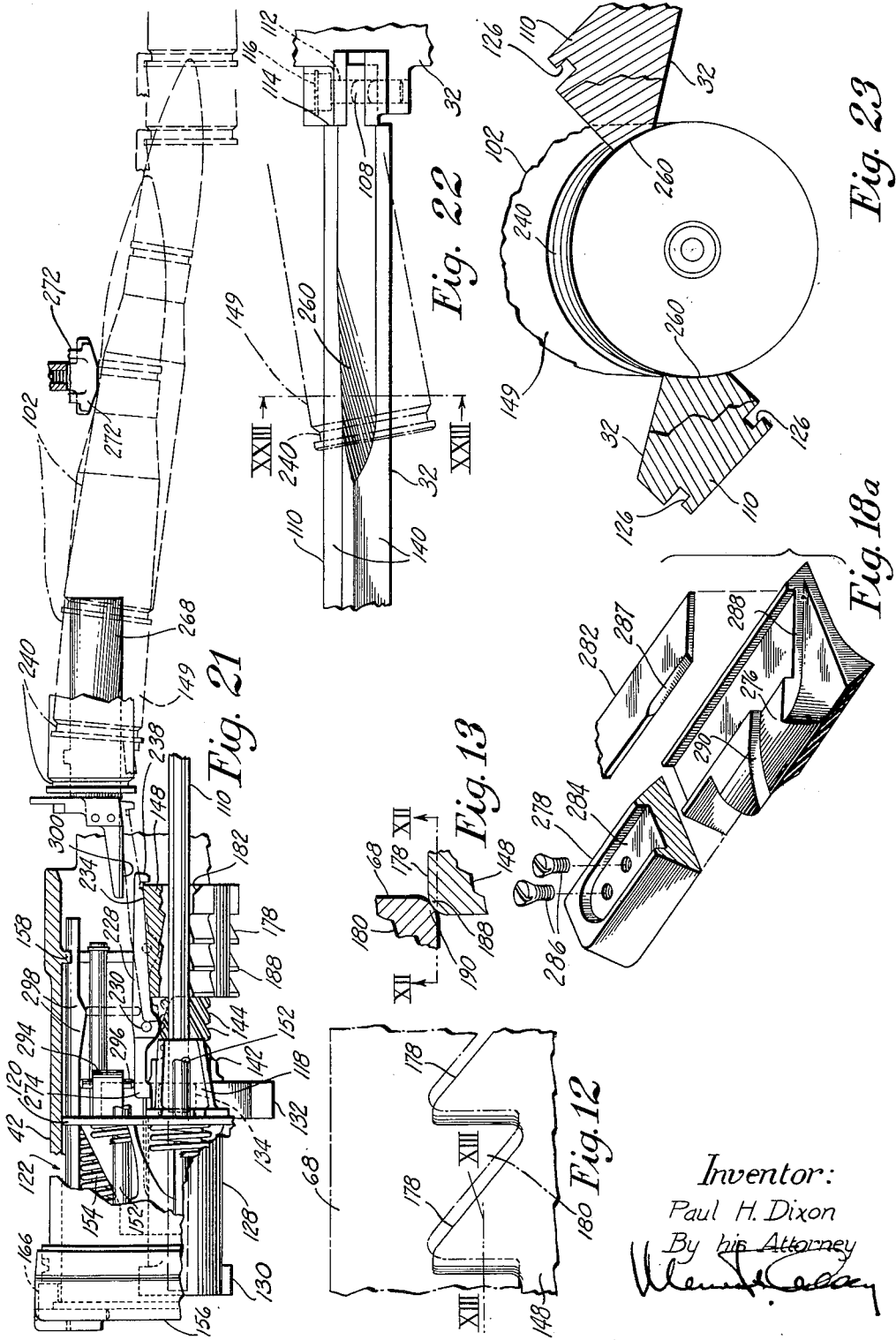

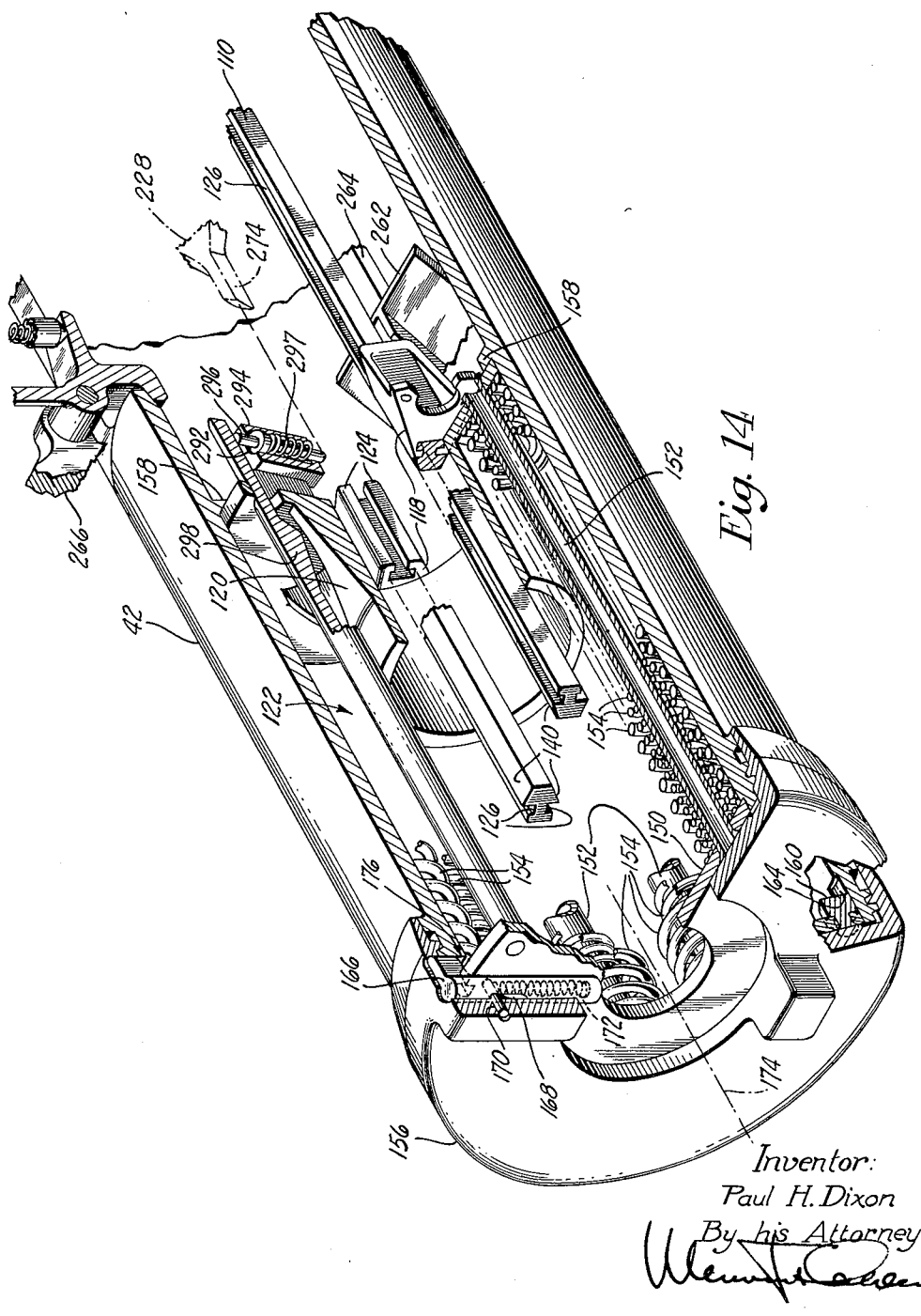

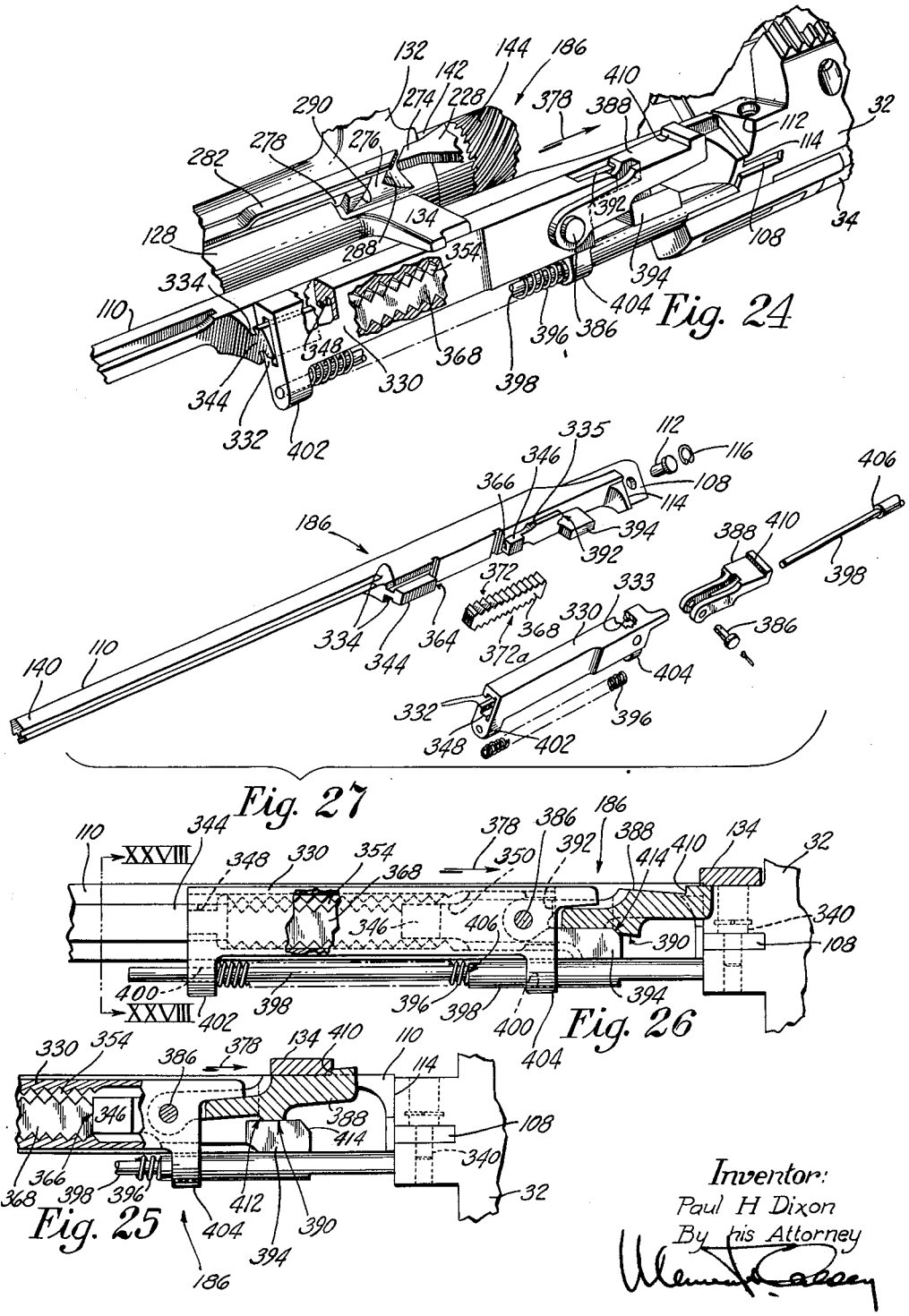

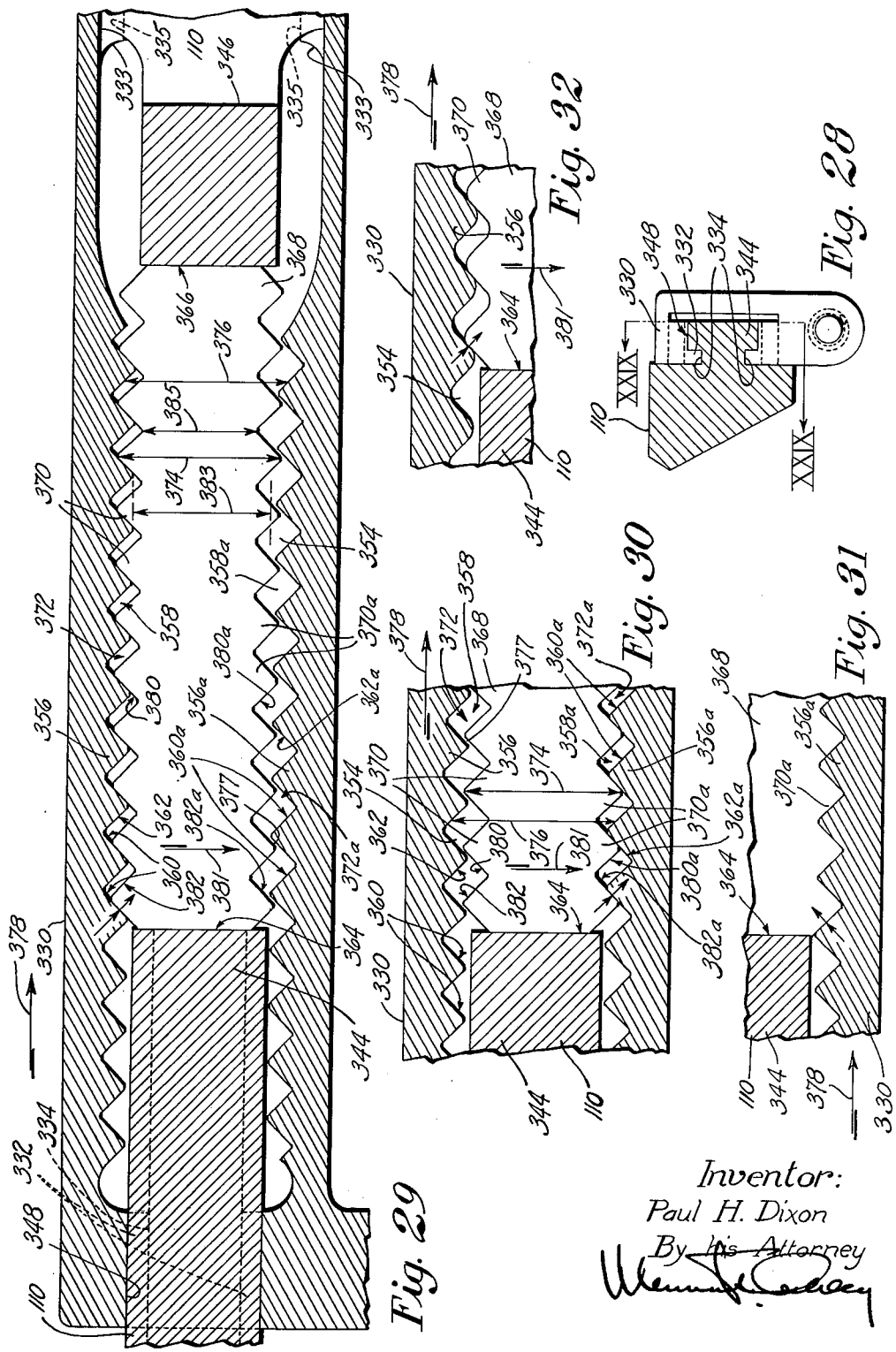

United States Patent Office 3,057,100
Patented Oct. 9, 1962

3,057,100
EXTRACTOR FOR AUTOMATIC GUNS
Paul H. Dixon, Rockford, Ill., assignor to United Shoe Machinery Corporation, Flemington, N.J., a corporation of New Jersey
Filed Jan. 9, 1947, Ser. No. 721,058
11 Claims. (Cl. 42—25)

This invention relates to ordnance, and is herein illustrated as embodied in an improved automatic 37 mm. gun.

In aerial combat an enemy airplane is usually in the sights of a gun for only a few seconds at a time during which a burst is fired by the gun. The effectiveness of the gun used for this type of combat depends to a large extent on the number of rounds fired during each of such bursts and this is, of course, determined by the cyclic rate at which the gun operates. The 37 mm. gun now extensively used for this purpose has a relatively low cyclic rate and, accordingly, an object of the present invention is to provide a more effective automatic 37 mm. gun having a cyclic rate considerably greater than that of 37 mm. guns now available.

The illustrative gun comprises a barrel and a barrel extension which, after the firing of a cartridge, move in recoil in a receiver against the action of a recuperator, and a slider having threaded onto it a bolt, said slider and bolt being moved as a unit together with the barrel extension during its movement in recoil. As the barrel and its extension approach the end of their recoil movement the slider is moved in recoil with relation to the bolt and the barrel extension by mechanism actuated by gases tapped from the rear portion of a bore of the barrel, causing rotation and accordingly unlocking of the bolt from the barrel extension. After the bolt has been unlocked from the barrel extension the slider, together with the bolt, is moved in recoil at a very high speed by the action of said gas actuated mechanism acting upon the slider, movement in recoil of the slider, the bolt, and a rocker which is pivotally mounted upon the bolt and during said movement operates as an extractor for a case of the expended cartridge, being limited by a reaction unit housed in the rear end of the receiver. While the slider and the bolt move in recoil under the action of said mechanism the barrel and its extension move in counter-recoil back to battery position under the action of the recuperator, a cartridge prior to such time being automatically moved to a cradled position in the receiver by a suitable feeder. The cartridge in said cradled position is forced forward and, assisted by suitable guiding mechanism, downward into a cartridge chamber of a bore of the barrel, during counter-recoil movement of the bolt and the slider powered by the reaction unit, by said rocker which in accordance with a feature of the present invention operates as a rammer during movement of the bolt in counter-recoil and which operates as an extractor, as above stated, during movement of the bolt in recoil.

The bolt is provided with internal helical threads which are in meshing engagement with external helical threads of the slider, the arrangement being such that the bolt, together with the slider, moves forward in counter-recoil until it engages, in accordance with another feature of the invention, a cam surface of a deflector ring fixed to and forming in effect part of the rear end of the barrel, with the result that the bolt starts to rotate with relation to the slider abou the axis of said helical threads. As the slider continues to move in counter-recoil with relation to the bolt, laterally projecting teeth of said bolt are rotated into locked battery position in front of opposite laterally projecting teeth of a bolt lock secured to and forming part of the barrel extension.

In accordance with a further feature of the invention, the slider has yieldingly secured to it an elongated electrode which is slidingly supported in a bore of the bolt and extends slightly forward of the bolt rotated to a locked battery position, said electrode being energized from a suitable source when the slider reaches the forward position of its movement in counter-recoil.

As the rocker operating as a rammer forces the cartridge forward into the cartridge chamber of the barrel it slides over the rim and into a channel of the cartridge and thereafter rotates with the bolt as said bolt is locked in its battery position. In order that the rocker shall effectively operate as an extractor, said rocker in accordance with another feature of the present invention, is secured against movement on the bolt during rotation and recoil movement of the bolt, said rocker being released for movement upon the bolt near the rear end of its recoil movement, suitable cam operated mechanism being provided for moving the released rocker to its ramming position upon the bolt during the first part of the counter-recoil movement of said bolt.

In order to insure against excessive wear and/or breakage of gun parts by the fast moving slider and bolt at the end of their movement in counter-recoil and in order to provide for the effective locking of the bolt and the smooth operation of the illustrative gun, said gun comprises, in accordance with a further feature of this invention, a pair of energy dissipating buffers which are operatively connected to the slider near the forward end of its movement in counter-recoil and are constructed and arranged quickly and effectively to dissipate, through the slider, energy of the various counter-recoiling parts of the gun, said buffer being disconnected from the slider before the slider reaches the forward end of its movement in counter-recoil, the construction and arrangement being such that the slider, at the forward end of its counter-recoil movement, has sufficient speed for causing the various counter-recoiling gun parts to be effectively locked in battery position.

The above and various other features of the invention will be understood and appreciated from the following detail description read in connection with the accompanying drawings, in which:

FIG. 1 shows, partly in elevation and partly in section on line I—I of FIG. 3, a portion of a gun in which the present invention is embodied;

FIG. 2 is a section on line II—II of FIG. 1 showing a bolt in an unlocked position in a barrel extension housed in a receiver of the gun;

FIG. 3 is a view similar to FIG. 2 but showing the bolt in a locked battery position in said barrel extension;

FIG. 4 shows in perspective, with parts broken away, a recuperator of the gun, said recuperator being in its rest or battery position;

FIG. 5 is a longitudinal section on line V—V of FIG. 4 showing the recuperator in a fully recoiled position;

FIG. 6 is a perspective view, partly broken away and partly exploded, showing portions of a barrel extension, a receiver and parts associated therewith;

FIG. 7 is a perspective view showing the barrel extension, a bolt carrying slider in its battery position in said extension and buffers for checking counter-recoil movement of the slider;

FIG. 8 is a view somewhat similar to FIG. 7, the slider and a bolt carried by the slider having been moved with relation to the barrel extension to partially recoiled positions;

FIG. 8a is a section on line VIIIa—VIIIa of FIG. 8 showing the relative positions of the bolt and the slider when the bolt and the slider are being moved as a unit in recoil and counter-recoil;

FIG. 9 is an exploded view showing in perspective the slider, the bolt in its battery position upon the slider, a bolt lock and a bolt deflector ring;

FIG. 10 is a detail view showing the relative positions of the bolt, the bolt lock and the deflector ring immediately after the initial engagement of the bolt with the deflector ring;

FIG. 11 is a section on line XI—XI of FIG. 10;

FIG. 12 is a section on line XII—XII of FIG. 13 showing the relation of the bolt and the bolt lock as the bolt starts to rotate to its locked battery position under the action of the deflector ring;

FIG. 13 is a section on line XIII—XIII of FIG. 12;

FIG. 14 is a perspective view, partly in section and partly broken away, showing the rear portion of the receiver and a reaction unit mounted therein;

FIG. 15 is a section on line XV—XV of FIG. 1;

FIG. 16 is a section on line XVI—XVI of FIG. 15 illustrating portions of electric firing mechanism of the gun;

FIG. 17 is a section on line XVII—XVII of FIG. 3 showing mechanism for locking a barrel of the gun to the barrel extension;

FIG. 18 is a section on line XVIII—XVIII of FIG. 7 showing gas operated mechanism for moving the slider in recoil to unlock the bolt, and for assisting in effecting recoil movement of the slider and the bolt;

FIG. 18a is an exploded view of mechanism carried by the slider for controlling the action of a rocker which is mounted upon the bolt and operates alternately as an extractor and rammer;

FIGS. 19 and 20 are sections on line XIX—XIX of FIG. 9 showing mechanism for controlling the action of the rocker during two different stages in the firing cycle of the gun;

FIG. 21 is a side view illustrating the slider and the bolt moved to their fully recoiled positions against the reaction unit and also illustrating a cartridge in the process of being chambered;

FIG. 22 is a detail view showing mechanism for deflecting downward a case of a fired cartridge being extracted from the gun;

FIG. 23 is a view on line XXIII—XXIII of FIG. 22;

FIG. 24 is a perspective view showing the right buffer of a pair of buffers for reducing the speed of a bolt assembly of the gun in counter-recoil;

FIG. 25 is a side view, partly broken away and partly in section, illustrating the buffer of FIG. 24 at the time it is first engaged by the slider which forms part of the bolt assembly of the gun;

FIG. 26 is a view similar to FIG. 25 showing the buffer after it has been released by the slider and while it is held in its forward position by said slider;

FIG. 27 is an exploded view showing in perspective the various parts of the buffer;

FIG. 28 is a section on line XXVIII—XXVIII of FIG. 26;

FIGS. 29, 30 and 31 are views on line XXIX—XXIX of FIG. 28 showing the relation of a cage and an inertia block of the buffer during different stages of the slider checking action of said buffer; and FIG. 32 is a view on line XXIX—XXIX of FIG. 28 showing opposing portions of a slightly modified cage and inertia block of the buffer.

The illustrative gun comprises a barrel or tube 30, which has a bore 31 (FIGS. 4, 5 and 18), threaded into a barrel extension 32 provided with long and short longitudinal ribs 34, 36 movable along guideways 38 (FIG. 2), 40 (FIGS. 2 and 3) respectively, extending lengthwise of a receiver 42 having rigidly secured to it a trunnion ring 44 (FIGS. 1, 5 and 6) pivoted upon a cradle 46. Where the gun forms part of an armed turret (not shown) which is mounted for movement in azimuth and elevation as in many airplane mounts, it will be apparent that the trunnion ring 44 and the receiver 42 are secured to the turret.

Threaded onto and extending forward from the receiver 42 is a casing 48 (FIGS. 4 and 5) to a front inturned end of which is clamped, by a nut 50 and a setscrew 52, a circular bearing cup 54 having a cylindrical bore in which, as will be hereinafter explained, the barrel 30 slides approximately 4½ inches during its recoil with the barrel extension 32 which may be considered as part of the barrel. Recoil action of the barrel 30 and the barrel extension 32 is opposed by inner and outer concentrically arranged ring springs 56, 58, the inner springs being positioned between an assembly 60, which is threaded onto the barrel extension and is secured by setscrews 62 (only one shown) to said extension, and an inturned flange at the rear end of a floating cylinder or sleeve 64. The outer spring 58 is arranged between an outwardly extending flange at the forward end of said floating sleeve 64 and a retaining ring 66 which abuts against the forward end of the receiver 42 and may be considered as part of said receiver. When the gun is fired, the assembly 60 moves rearward together with the barrel extension 32 compressing the inner springs 56 which yield until the assembly engages the forward end of the floating sleeve 64 which is then moved rearward against the action of the outer springs 58 until the rear end of the floating sleeve engages the retaining ring 66, at which time practically all the kinetic energy of the recoiling barrel 30 and its extension 32 has been absorbed. The springs 56, 58 together with the above described mechanism for housing them and for causing them to absorb recoil energy of the barrel and its extension and to power the barrel of the barrel extension for movement in counter-recoil back to battery position will be hereinafter referred to as a recuperator.

The barrel extension 32 comprises a bolt lock 68, which is made in two halves and is secured to the main body of said extension by screws 70 with its rear face in engagement with a shoulder of the extension, and a deflector ring 72 which fits in a bore 74 (FIGS. 5 and 6) of the barrel extension, and has a depending lug 76 fitting in a recess 78 (FIGS. 2, 3 and 17) of the extension and is securely clamped between the barrel 30 and the bolt lock. In assembling the gun, the barrel 30 is screwed into the barrel extension 32 until its rear end has been moved into forced engagement with the deflector ring 72, which is placed in the barrel extension prior to securing the bolt lock 68 to said extension, a vertical slot 80 (FIGS. 6 and 17) in the barrel being provided for receiving a barrel lock 82 (FIGS. 1, 2, 3, 6 and 17) which at that time extends vertically of the gun.

The barrel 30 is locked against rotation with relation to its extension 32 by the barrel lock 82 which is supported by a pin 84 (FIGS. 6 and 17) secured by a screw 86 (FIG. 6) to said lock and pivotally mounted in bores of the barrel extension. After the barrel 30 has been screwed into the extension 32 to its proper position the barrel lock 82, which heretofore has been swung back to a retracted position, is swung forward into a locking or operative position, causing a lug 88 thereof to swing into a slot 90 (FIGS. 6, 9 and 10) in the deflection ring and to register in the barrel slot 80. The barrel lock 82 is held in its operative position by a plunger 92 (FIGS. 2, 3, 6 and 17) which is normally urged by a spring 94 (FIGS. 6 and 17) into a hole 96 in the deflector ring 72 and which may be manually moved out of said hole by drawing rearward a depending finger 98 attached to the plunger. As will be explained later, the upper surface 100 of the barrel lock 82 is concaved lengthwise to insure that, in the event that the nose of a cartridge 102 (FIGS. 1, 21 and 23) in being chambered should for some reason be excessively deflected downward, it will engage said surface and slide forward into a cartridge chamber 104 (FIGS. 1, 4, 5, 6 and 18) of the bore 31 of the barrel 30.

The rear end of the barrel extension 32 is slotted to receive tongues 108 at the forward ends of rails 110, bolts 112 (FIGS. 6, 8, 22, 24 and 27) serving to secure the rails to said extension with their shoulders 114 in abutting relation with the extension. The bolts 112 are retained in their operative positions in the barrel extension 32 by snap rings 116. The rails 110, which may be considered as part of the barrel extension 32 and may be collectively referred to as a guide or as guides, are supported and guided for movement in recoil and counter-recoil with the barrel extension 32 by blocks 118 (FIGS. 1, 14 and 21) which are riveted to a drum-shaped header 120 of a reaction unit 122 and have opposing flanges 124 (FIG. 14) fitting in longitudinal grooves 126 (FIGS. 7, 14 and 15) of the rails.

Mounted for movement in recoil and counter-recoil on the rails 110 is a slider 128 provided with pairs of diverging lugs 130 (FIGS. 7, 9, 15 and 21) and pairs of abutments 132, 134 forming notches 136, 138 (FIG. 9), opposite sides of which engage converging faces 140 of the rails. The slider 128 has a forward shank 142 provided with helical threads 144 and mounted upon said shank with its internal helical threads 146 (FIGS. 1, 2, 3 and 10) meshing with the threads 144 is a bolt or breechblock 148 which is locked in battery position to the bolt lock 68 secured to the barrel extension 32, by means hereinafter described, during the major part of the recoil action of the barrel 30 and its extension. The bolt 148 is unlocked by gas operated mechanism, described later, just before the end of the recoil movement of the barrel extension, blow-back action of a cartridge case 149 (FIGS. 1, 21, 22 and 23) against the bolt assisted by the action of gas operated mechanism against the abutments 132 of the slider causing said slider 128, together with the bolt, to move at a high velocity in recoil along the rails 110, the abutments 134 of the slider being moved with considerable force against the header 120 of the reaction unit 122.

The reaction unit 122 comprises the header 120 and an end plate 150 (FIG. 14) to which are secured a plurality of guide rods 152 (FIGS. 1, 14 and 21) extending through and fitting in circular recesses in the header. Encircling each of the rods 152 and interposed between the header 120 and the end plate 150 are three concentrically arranged reaction springs 154. The reaction unit 122 may be readily inserted in and removed from the receiver 42 after an end cap 156 (FIGS. 14 and 21) has been removed from the receiver, the header 120 being forced against an inwardly extending flange 158 of the receiver and the springs being initially compressed slightly by forward force applied against the end plate as the cap is mounted upon and secured to the receiver. In order to insure that the reaction unit 122 may be arranged in its proper position circumferentially of the receiver, the end plate 150 has secured to it a stud 160 (FIG. 14) constructed and arranged to fit in a channel 164 formed in the receiver.

The end cap 156 and the receiver 42 are internally and externally threaded respectively, the cap being screwed onto the receiver. In order to secure the end cap 156 in its operative position shown in FIG. 14 against rotation upon the receiver 42, said cap has slidingly mounted in it a latch 166 which is provided with an elongated slot 168 through which passes a pin 170 carried by the cap. Confined in a bore of the latch 166 and engaging the pin 170 is a spring 172 which constantly urges the latch toward the central axis 174 (FIGS. 1 and 14) of the receiver and when the cap 156 is in its proper position on the receiver into a slot 176 formed in the wall of said receiver. Preparatory to removing the end cap 156 and thereafter the reaction unit 122 from the receiver 42, the latch is raised out of the slot 176 in the receiver by upward pressure applied to the lower end of the latch against the action of the spring 172.

When the gun is ready for firing as illustrated in FIG. 1 the slider 128 is in its forward battery position in the bolt 148 which at that time has been rotated clockwise, as viewed from the rear, upon the slider about the axis of the helical threads 144, 146, the teeth 178 of the bolt 148 then being in interlocked relation with teeth or lands 180 of the bolt lock 68 and a front face 183 of the slider being in engagement with a face 185 of the bolt. The slider 128 and the bolt 148 under power applied by the reaction unit 122 are moved as a unit in counter-recoil, the bolt being in its forward position illustrated in FIGS. 8 and 8a upon the slider, the forward face 183 of the slider at such time being spaced from the face 185 of the bolt. As the bolt 148 reaches the forward portion of its movement in counter-recoil, angled faces 182 (FIGS. 8, 9 and 11) at the forward end thereof engage angled faces 184 (FIGS. 5, 9 and 11) of the deflector ring 72 causing initiation of clockwise rotation, as viewed from the rear, of the bolt upon the helically threaded shank 142 of the slider 128.

As will be explained later, the gun is provided with improved buffers 186 (FIGS. 7, 8, 24, 25, 26 and 27) which may be collectively referred to as a buffer and which materially reduce the velocity of the slider 128, together with other recoiling and counter-recoiling parts of the bolt assembly, at the forward end of its movement in counter-recoil, thereby insuring against undue stresses being imposed on the various colliding gun parts and also reducing the probability of the projectile of the cartridge 102 being thrown forward from its crimped position in the cartridge case. When the bolt 148, at the forward end of its counter-recoil movement, engages the deflector ring 72 and starts to rotate as above explained, rounded corners 188 (FIGS. 8, 9, 13 and 21) of the teeth 178 of the bolt 148 are moved in front of opposed corners 190 (FIGS. 5, 9, 11 and 18) of the teeth 180 of the bolt lock 68 and as the slider 128 moves forward with relation to the bolt, said bolt is further rotated and moves slightly forward as permitted by the faces 184 of the deflector ring with the result that the teeth 178 of the bolt move transversely in front of and into interlocked relation with the opposing teeth 180 of the bolt lock 68.

The gun is fired by mechanism comprising an electrode 192 (FIGS. 1, 2, 3, 15, 16, 19 and 20) which has the general appearance of a firing pin and is slidable in a passage 193 (FIG. 1) in an insulating lining 194 of a sleeve 196 movable in alined bores 198, 200 of the slider 128 and the bolt 148 respectively, and having a circular head 202 fitting in an enlarged opening 204 in the forward end of said bolt. The head 202 of the sleeve 196 is held in the opening 204 by a spring 206 arranged in a chamber 208 (FIGS. 1 and 16) of the slider 128 and having its opposite ends respectively in engagement with the slider and a washer 210 secured to and forming in effect part of the sleeve.

Clamped between a flange 212 (FIG. 16) of the electrode 192 and an insulating disk 214, against which is forced a nut 216 threaded onto the electrode, is an insulating stud 218 mounted for sliding movement through an opening 220 formed in a plate 222 (FIGS. 1, 9, 15 and 16) secured to the slider 128, a spring 224 (FIG. 16) normally holding the disk 214 in engagement with the plate. When the slider 128 is in battery position, the face 183 of said slider then being in engagement with the face 185 of the bolt 148 as shown in FIG. 1, the forward end of the electrode 192 engages the rear end of the chambered cartridge 102, the spring 224 being slightly compressed by rearward movement of the electrode in engagement with said cartridge. When there is no cartridge in the chamber 104, the forward end of the electrode 192 projects slightly forward of the circular head 202 of the sleeve 196. With the above construction it will be apparent that the electrode 192 effectively contacts the cartridge 102 even though the rear end of the case of said cartridge be recessed.

Secured to the electrode 192 by a screw 226 (FIGS. 15 and 16) is a wire cable 221 (FIGS. 1, 9, 15 and 16) connected to a contact member 223 (FIGS. 1 and 15) which is carried by the slider and which during the forward part of the movement of the slider in counter-recoil contacts an elongated terminal 225 insulated from the gun and energized from an outside source. When the bolt 148 during its forward movement with the slider 128 first engages the deflector ring 72, the electrode 192 is in its retracted position in the passage 193 as shown in FIG. 8a and as the slider moves forward with relation to the bolt 148, causing said bolt to rotate about the axis of the helical threads 144, 146 into its interlocked battery position with the bolt lock 68, the electrode moves forward into engagement with the chambered cartridge 102 causing it to be fired.

A combined extractor and rammer 228, which may be referred to as a rocker, is fulcrumed on a pin 230 secured to bifurcations 232 at the rear end of the bolt 148 and is constantly urged toward a stop face 234 (FIGS. 1 and 21) of the bolt by a leaf spring 236 (FIGS. 1, 8 and 9). When the rocker 228 operates as an extractor, it is desirable that its lip 238 (FIGS. 1, 8 and 21) shall be held in place in a groove 240 (FIGS. 1, 21 and 23) of the cartridge case 149 and when the rocker operates as a rammer, it should be free to tilt upon the bolt 148 in order to permit it to move into the position shown in FIG. 21 preparatory to engaging the rear end of the cradled cartridge for driving said cartridge forward and thereafter riding up over the rim of the cartridge and into said groove. Moreover, when the bolt 148 is being rotated to and from its locked battery position in the barrel extension 32, it is desirable to hold the rocker 228 in engagement with the stop face 234 of the bolt in order to insure against the forward end of said rocker moving away from the cartridge under the action of centrifugal force.

The illustrative gun is designed for a high rate of fire and accordingly the slider 128 and the bolt 148 together with associated recoiling and counter-recoiling parts, which as an entirety may be referred to as a bolt assembly, are moved at a very high rate of speed both in recoil and counter-recoil. In order to unlock the bolt 148 from its battery position in the barrel extension 32 and to expedite recoil movement of the bolt assembly with or without the assistance of blowback action of the gun, there are provided a pair of gas operated pistons 242 (FIGS. 2, 6, 7, 8 and 18) which are slidable in bores 244 (FIGS. 2, 7 and 18) in the long ribs 34 of the barrel extension 32 and operate against the forward faces of the abutments 132 of the slider 128. Each of the pistons 242 is provided with a chamber 246 (FIGS. 2 and 18) forming with a chamber 248 of reduced diameter in a corresponding rib 34 of the barrel extension 32, an expansion chamber connected to the rear portion of the bore 31 of the barrel 30 by a gas passage 250 (FIG. 18) formed in part by a restricted opening in a silver heat dissipating plug 252 fitting in a pocket 254 of the barrel.

When the gun is fired the burning high pressure gases escape through the passages 250 into the chambers 248, 246 causing the pistons 242 to be forced against the front faces of the abutments 132 with the result that the slider 128 attempts to move in recoil and to rotate the bolt 148 to a position in which its teeth 178 are moved from locking engagement with teeth 180 of the bolt lock 68 and into registry with longitudinally extending grooves 256 (FIG. 3) of said lock so that the bolt together with the slider may be moved in recoil. Until the projectile of the fired cartridge has left the bore 31 of the barrel 30, the blowback pressure of the cartridge case against the bolt 148 is so high that rotation of the bolt is prevented, due to frictional contact of the bolt with the bolt lock 68, the pressure in the chambers 248, 246 during this time increasing considerably. Just before the barrel 30 and its extension 32 reach the rearward end of their recoil movement against the action of the recuperator, the blowback pressure in the barrel bore has been reduced to a point which permits pressure of the pistons 242 against the slider 128 to overcome frictional pressure between the bolt 148 and the barrel extension, rearward movement of the pistons acting upon the slider and thus causing the bolt to rotate to its unlocked position upon the helically threaded shank 142 of the slider. Blowback action against the bolt 148 in combination with the pressure exerted by the pistons 242 against the abutments 132 causes the slider 128 and the bolt to move in recoil at a high speed, the abutments 134 of the slider engaging the header 120 of the reaction unit 122 which provides the energy or power for moving the slider and the bolt at a high speed in counter-recoil. Rearward movement of the pistons 242 is limited by the engagement of their rear ends with shoulders 258 (FIGS. 6, 7, 8 and 18) formed on rearward extensions of the ribs 34. The pistons 242 are engaged by the abutments 134 during movement in counter-recoil of the slider 128 for moving said pistons to their starting positions illustrated in FIG. 18. The unlocking action of the bolt may be delayed until all the gas pressure in the bore of the barrel of the gun is dissipated.

As the bolt 148 moves in recoil and the barrel 30 and its extension 32 move in counter-recoil to their battery positions, the case 149 of the expended cartridge is extracted from the cartridge chamber 104 by the rocker 228, the rear end of said case engaging cam surfaces 260 (FIGS. 22 and 23) extending along the inner forward portions of the rails 110, with the result that the rear end of the cartridge case is deflected downward into engagement with the under side of a deflector plate 262 (FIGS. 1 and 14) secured to the receiver 42 causing the case to pass through an opening 264 in the bottom of the receiver 42.

The cartridges 102 are delivered successively from a feed box 266 (FIGS. 1 and 14) to the cradled or ramming position shown in FIG. 1 in which the rear and front ends of the case 149 of the cartridge are in engagement with a two-part tray 268 (FIG. 1) and a swiveled arm 270 respectively, the projectile of the cartridge being disposed between deflector arms 272 (FIGS. 1 and 21), the construction and arrangement being such that forward movement of the rocker 228 in engagement with the rear end of cradled cartridge 102 deflected downward by the arms 272 causes said cartridge to be moved into the cartridge chamber 104 of the barrel 30. Should the cartridge 102 be deflected downward too abruptly from its cradled position the nose of the projectile of the cartridge will engage the upper surface 100 (FIGS. 2, 3 and 6) of the barrel lock 82, causing the cartridge to be cammed by said surface into the cartridge chamber 104.

As above stated, during rotation of the bolt 148 on the slider 128, and during the major part of the recoil movement of the bolt and the slider, the rocker 228 is held against the stop face 234 (FIGS. 1 and 21) of the bolt. Locking of the rocker 228 against the stop face 234 of the bolt 148 is effected while the bolt is being rotated clockwise, as viewed from the rear, upon the slider 128 to its locked battery position in the bolt lock 68, by the engagement of a rear shank portion 274 of the rocker with a cylindrical surface 276 of a slide 278 which is freely movable lengthwise in an undercut groove 280 (FIGS. 9, 19 and 20) formed in the top of the slider 128. As will be explained later, during the cartridge extracting action of said rocker 228, its shank portion 274 is in engagement with the upper surface of a leaf spring 282 positioned in a groove 284 (FIGS. 18a, 19 and 20) at the top of the slide 278 and secured by screws 286 (FIGS. 1, 7, 9 and 18a) at its rear end to the slide. It will be noted that the forward end of the spring 282, as well as shoulders 288, 290 (FIGS. 8, 9, 18a and 24) of the slide 278, and the rear face of the shank portion 274 of the rocker 228 are inclined to the longitudinal axis of the slider at approximately the same angle as are the helical threads on the slider 128, the arrangement being such that as bolt 148 rotates on the slider from its position illustrated in FIGS. 8 and 8a to its position illustrated in FIG. 9, the rear face of said shank portion 274 moves along the forward end of the spring 282 and the shoulder 288, onto cylindrical surface 276. As counter-recoil movement of the bolt 148 is arrested the shank portion 274 of the rocker 228 overlies the cylindrical face 276 of the slide 278 with the result that said slide 278 moves forward on the slider 128 under the shank portion 274 of the rocker 228 until the shoulder 290 of the slide engages the rear face of said shank portion. When the bolt 148 is rotated counterclockwise, as viewed from the rear, to unlock it from the bolt lock 68, the shank portion 274 of the rocker 228 moves along the shoulder 290 of the slide 278, engages the beveled face 287 (FIGS. 18a, 19 and 20) of the spring 282, and depresses said spring into the groove 284, said shank portion being arranged above the spring in the position illustrated in FIG. 20 when the bolt is fully unlocked ready to be moved in recoil together with the slider 128.

When the bolt 48 has been unlocked from the bolt lock 68 and the bolt and the slider 128 are being moved as a unit in recoil, the rocker 228 is positively held against the stop face 234 (FIGS. 1 and 21) of the bolt by the spring 282 of the slide 278 then positioned under the shank portion 274 of the rocker. Upon engagement of the abutments 134 of the slider 128 with the header 120 of the reaction unit 122, the slide 278, which carries the spring 282, by reason of its momentum, moves rearward along the groove 280 with relation to the slider until it engages the rear end of said groove, with the result that the spring 282 is withdrawn from beneath the shank portion 274 of the rocker 228 and assumes its position shown in FIG. 8, thus permitting the rocker 228 to pivot to a limited extent upon the pin 230 carried by the bifurcations of the bolt 148.

In order to tilt the front end or forward lip 238 of the rocker 228 upward upon the bolt 148 to cause it to engage the rear end of the cradled cartridge 102 during its movement in counter-recoil, the gun is provided with mechanism which will now be described. Slidingly mounted in a vertical bore 292 (FIG. 14) of a lug 294 (FIGS. 1, 14 and 21) secured to the header 120 of the reaction unit 122 is a pin 296 normally forced by a spring 297 against a cam 298 formed on one of the guide rods 152. As the slider 128 and the bolt 148 are moved in recoil, the upper surface of the shank portion 274 of the rocker 228 engages the lower end of the pin 296, the spring 282 of the slide 278 having been previously slid rearward from beneath said shank portion at the time of initial contact of the abutments 134 of the slider with the header 120 of the reaction unit 122. As the header 120 moves rearward together with the slider 128 and the bolt 148 against the springs 154, the pin 296 actuated by a projecting portion of the cam 298 causes the rocker 228 to be tilted counterclockwise, as viewed in FIG. 21, the rocker then moving back approximately to its horizontal position upon the bolt as the pin travels along a rear horizontal portion of the cam. Upon movement of the bolt assembly in counter-recoil, the pin 296 which moves forward along the projecting portion of the cam 298, tilts the rocker 228 counter-clockwise, as viewed in FIG. 21, to its dot-dash position in which the lip 238 of said rocker is raised sufficiently to engage the rear end of the cradled cartridge 102.

In order to limit counterclockwise movement of the rocker at the time of its initial contact with the cradled cartridge the tray 268 has secured to it a limit stop 300 or abutment (FIGS. 1 and 21) which is engaged by the forward end of the rocker. During counter-recoil movement of the bolt assembly the cartridge 102 is forced forward and guided into the cartridge chamber 104 by the rocker 228 operating in cooperation with the mechanism described, the front end of the rocker, which is then free to override the rim of the cartridge case 149, entering the groove 240 of said case. As above explained, when the angled faces 182 (FIGS. 8, 9, 11 and 21) of the bolt 148 engage cam faces 184 of the deflector ring 72, the bolt starts to rotate clockwise as viewed from the rear, continued forward movement of the slider 128 causing the teeth 178 of the bolt 148 to rotate in front of opposing teeth 180 of the barrel lock 68 to lock the bolt in battery position. When the bolt 148 is rotated clockwise, as viewed from the rear, during forward movement of the slider 128 with relation to the bolt, the shank portion 274 of the rocker 228 is forced against the cylindrical surface 276 of the slide 278 causing said rocker to be held against the stop face 234 of the bolt and thus insuring against rotation of the bolt causing the forward end of the rocker to be raised from the groove 240 of the cartridge.

When the slider 128 is first moved in recoil by the pistons 242, counterclockwise movement of the bolt 148, as viewed from the rear, upon the slider to unlock said bolt from the bolt lock 68 causes the shank portion 274 of the rocker 228 to move along the surface 276 of the slide 278 and over the bevel spring surface 287 onto the spring 282, causing said spring to be forced into the groove 280 as shown in FIG. 20 thus retaining the rocker in engagement with the stop face 234 of the bolt. After the bolt 148 has been unlocked the entire bolt assembly moves in recoil, the rocker 228 being held against movement upon the bolt until the slide 278 and its spring 282 are moved under their momentum from underneath the shank portion 274 of the rocker when the slider 128 strikes the reaction unit header 120. By locking the rocker 228 against movement upon the bolt 148 while the bolt is being unlocked and during recoil of the bolt the rocker serves as an effective extractor for the case 149 of the fired cartridge.

Each of the illustrative buffers 186 comprises a cage or slide 330 which is provided with inturned flanges 332 (FIGS. 24, 27, 28 and 29), 333 (FIGS. 27 and 29) fitting in channel guides 334, 335 (FIGS. 27 and 29) respectively, formed in an associated rail 110. A lug 344, which is formed integral with the rail and engages in a longitudinal guideway 348 (FIGS. 24, 26, 27 and 28) of the cage, cooperates with the channels 334, 335 in guiding said cage in a rectilinear longitudinal path extending parallel to the path of movement of the slider 128 in recoil and counter-recoil. Formed integral with each of the rails 110 is a lug 346 (FIGS. 25, 26, 27 and 29), the purpose of which will appear later.

Arranged at opposite sides of a chamber, which is formed by one of the rails 110 and a channel or recess 354 of the cage 330, are V-shaped teeth 356, 356a (FIGS. 29 and 30) constituting racks 358, 358a which extend lengthwise of the path of movement of the cage, front and rear operating faces 360, 362, 360a, 362a of the teeth 356, 356a, respectively, being disposed at 45° to said path and teeth of the rack at one side of the channel being offset longitudinally by one-half a tooth from the teeth of the rack at the other side of the channel. Mounted for transverse or lateral movement in the channel 354 of the cage 330 with its rear and forward ends in sliding engagement with faces 364 (FIGS. 27, 29, 30, 31 and 32), 336 (FIGS. 25, 27 and 29) of the lugs 344, 346, respectively, is an inertia block 368 having at its upper and lower faces V-shaped teeth 370 (FIGS. 29 and 30), 370a which are similar to the teeth of the racks 358, 358a of the cage 330 and form racks 372, 372a (FIGS. 27, 29, and 30) arranged in opposed and interengaging relation with the racks 358, 358a of the cage.

It will be noted that the teeth 370, 370a of the inertia block 368 are in transverse alinement or register, the distance 374 (FIGS. 29 and 30) between the ends of the opposite teeth of said block being slightly less than the transverse distance 376 between the teeth 356, 356a of the racks 358, 358a on any straight line normal to the path of movement of the cage, it being apparent that since the teeth 356, 356a of said racks are offset lengthwise by one-half a tooth the zig-zag channel 354 is of uniform width. With the above construction clearances 377 (FIGS. 29 and 30) are formed between opposing racks 358, 372 and 358a, 372a.

As will be explained later, as the cage 330 is moved forward, that is, in the direction indicated by arrow 378, at a high rate of speed in response to counter-recoil action of the slider 352, the operating or leading faces 360 of the teeth 356 of the rack 358 are slammed, for example, as illustrated in FIG. 29, against the rear faces 380 (FIGS. 29 and 30) of the teeth 370 of rack 372 of the inertia block 368, with the result that said block is moved transversely, that is, in the direction indicated by arrow 381, causing the faces 382a of the teeth 370a to strike, pound against, or to collide with rear faces 362a of the teeth 356a as illustrated in FIG. 30, the leading faces 360a of the teeth 356a of the rack 358a thereafter striking against the faces 380a of the teeth 370a of the block 368 and thus causing faces 382 of the teeth 370 of the block to move transversely in an opposite direction into striking engagement with the rear faces 362 of the teeth 356 of the rack 358, the oncoming leading faces 360 of the teeth 356 then striking the rear faces 380 of the teeth 370 of the rack 358 to repeat the above-described cycle of operation.

The channel 354, which extends lengthwise of the path of longitudinal movement of the cage or slide 330, may be described as having serrated edges or opposite sides bounded by teeth arranged in series or in the form of racks extending lengthwise of said path. Moreover, it will be understood that since the teeth 356, 356a, 370, 370a may deviate from the form shown in FIGS. 29, 30 and 31 and have their ends and roots rounded off, for example, as illustrated in FIG. 32, the edges of the channel 354 may be defined as sinuous or undulatory. In fact, sharp teeth of the buffer will become somewhat rounded after being used for a short time.

The inertia block 368 which is confined in the channel 354 of the cage 330 has its teeth 370, 370a arranged in series extending lengthwise of the path of movement of the cage, as above explained, the teeth 370 at one side of the block being positioned in transverse alinement or register with the teeth 370a at the other side of the block. Since the ends of the teeth or serrations of the block 368 may be initially rounded somewhat as illustrated in FIG. 32, or may become rounded in use, the block 368 may also be defined as having undulatory or sinuous edges and as being alternately wide and narrow, the wide portions of the block or the distance 374 between the points or outer ends of the teeth 370, 370a of the block 368 being slightly less than the width 376 of the channel 354. Furthermore, the cage or slide 330 may be described as having formed between its opposite racks or sinuous edges, a longitudinally clear space 383 (FIG. 29) slightly wider than the distance 385 between the roots of opposing teeth 370, 370a of the block 368 plus the height of one of the teeth of said block.

The cage or slide 330 may also be described as having longitudinally arranged serrations, rows of teeth 356, 356a or sinuous edges which are in inter-engaging relation with longitudinally arranged serrations, rows of teeth 370, 370a or sinuous edges of the block 368, the serrations, teeth or sinuous edges of one of said members overlapping transversely the opposing teeth, serrations or sinuous edges of the other member. The teeth 356, 356a of the serrated or toothed edges of the cage 330 or the projecting portions of the opposite sinuous edges of the cage may be described as being off-set one-half a tooth or half a projecting portion longitudinally from one another and as facing inwardly, that is, toward one another, the teeth 370, 370a of the serrated or toothed edges or the projecting portions of the sinuous edges of the block 368 being described as being in transverse alinement with each other and as facing outwardly.

The cage 330 has pivotally connected to it by a pin 386 (FIGS. 24 to 27) a latch 388 having a face 390 (FIGS. 25 and 26) which, when the buffer is in a rear, retracted position with the latch in engagement with a stop 392 (FIGS. 24 and 26), rests on top of a lug or cam 394 of the rail 110. The cage 330 is held in its retracted position by a spring 396 encircling a rod 398 which slides through bores 400 (FIG. 26) in depending lugs 402, 404 of the cage, has a shoulder 406 (FIGS. 26 and 27) engaged by the forward end of the spring, and has its forward end in engagement with the barrel extension 32, the rear end of the spring engaging the lug 402 of the cage.

As the slider 128, actuated by the reaction unit 122, moves in counter-recoil at a high speed, the abutment 134 of the slider engages and accordingly becomes interlocked with a shoulder 410 of the projected latch 388, the face 390 of which at that time is sustained by the cam or lug 394 of the rail 110, causing the cage 330 to be moved forward until said face 390 has been moved to its position shown in FIG. 26, thereby permitting the latch to swing downward to its retracted position and the shoulder 410, which is arranged higher than the pin 386, to be lowered below the abutment 134. As the abutment 134 leaves the shoulder 410 it slides over an upper face of the latch 388 and in its battery position is still in contact with said face causing a face 412 (FIG. 25) of the latch to be held in contact with a bevel face 414 (FIG. 25 and 26) of the lug 394, for the purpose of retaining the cage 330 in its forward position until such time as the abutment 134 of the slider 352 has moved rearward in recoil away from the latch, the spring 396 thereafter operating to move the cage upon the rail 110 back to its rearward position in which the latch 388 is in engagement with the stop 392.

In the illustrative embodiment the inertia block 368 has twelve teeth at each of its upper and its lower edges, the teeth at each edge being constructed and arranged to engage opposing teeth of the cage. By providing a plurality of colliding surfaces the impact load is well distributed thus insuring that the various parts stand up effectively under considerable use.

By causing a plurality of collisions between the teeth of the cage 330 and the teeth of the inertia block 368 a large amount of energy is quickly and effectively dissipated, resulting in the intermittent slowing down of the cage by the block. It will be apparent that the intermittent slowing down of the cage 330 results in a series of collisions between the latch 388 and the abutment 134 of the slider 352 and this, together with various friction losses between the parts, adds materially to the dissipation of the energy of the counter-recoiling slider.

The rate of dissipation of energy will vary approximately in accordance with the square of the velocity of the moving parts, the restitution factor of steel being such that the velocity of the slider is materially checked after the teeth of the cage 330 have moved past a few teeth of the inertia block 368. As the high velocity is materially reduced the percentage of total kinetic energy absorbed per unit of movement of the cage 330 is greatly reduced and accordingly the cage may move a considerable distance without depriving the slider of a highly desirable residual speed necessary to cause said slider 128 to lock the bolt 148 in battery position. In order, however, to insure that there shall not be any drag whatsoever on the slider 128 after its speed has been reduced to a value sufficiently low to effect the proper locking of the bolt 148, the latch 388 is cammed down out of driving or interlocking relation with the abutment 134 of the slider 128 at a predetermined time, depending upon the position of the lug 394.

Although the buffer has been illustrated with reference to the above-mentioned gun, it will be understood that such a buffer, which is disclosed and claimed in United States Letters Patent No. 2,490,787, granted December 13, 1949, on an application filed in my name, may be effectively used wherever it is desired suddenly to reduce the speed of fast moving parts.

Having thus described my invention, what I claim as new and desire to secure by Letters Patent of the United States is:

1. In an automatic gun, a barrel, a breechblock mounted for movement in recoil and counter-recoil and also for rotation with relation to the barrel, an extractor pivotally mounted upon the breechblock, and mechanism which is movable in recoil and counter-recoil together with and with relation to the breechblock and is adapted to lock the extractor against pivotal movement upon said block during rotation of the block and during movement of said block in recoil.

2. In an automatic gun, a barrel, a bolt mounted for movement in recoil and counter-recoil and also for rotation with relation to the barrel, a spring, an extractor which is pivotally mounted upon the bolt and has a cartridge-engaging end constantly urged toward said bolt by the spring, and mechanism in addition to said spring for forcing the cartridge-engaging end of the extractor against the bolt and for locking it in such position during rotation of the bolt and during movement of said bolt in recoil, said mechanism being movable in recoil and counter-recoil together with and with relation to the bolt.

3. In an automatic gun, a bolt mounted for movement in recoil and counter-recoil, a combined extractor and rammer mounted for pivotal movement upon the bolt, mechanism which is movable in recoil and counter-recoil together with and with relation to the bolt and is adapted to lock said combined extractor and rammer against movement on the bolt to cause it to operate as an extractor and which is constructed and arranged to release the combined extractor and rammer for movement upon the bolt at the end portion of the recoil movement of the bolt to permit it to operate as a rammer, and means for moving the released combined extractor and rammer to a ramming position and for retaining it in such position during a portion of the movement of the bolt in counter-recoil.

4. In an automatic gun, a bolt mounted for movement in recoil and counter-recoil, a combined extractor and rammer mounted for movement on the bolt, means movable in recoil and counter-recoil for locking said combined extractor and rammer against movement on the bolt to cause it to operate as an extractor and for permitting movement of the combined extractor and rammer on the bolt to allow it to operate as a rammer, and means for moving on the bolt said combined extractor and rammer to a position in which it operates as a rammer.

5. In an automatic gun, a bolt mounted for movement in recoil and counter-recoil, a rocker mounted for pivotal movement upon the bolt, means for securing the rocker to the bolt during a portion of the recoil movement of said bolt to cause said rocker to operate as an extractor for withdrawing the case of a fired cartridge from a chamber of a barrel of the gun, said means during counter-recoil movement of the bolt being positioned to permit movement of the rocker on the bolt to enable the rocker to operate as a rammer for forcing a cartridge into said chamber of the barrel, and cam actuated means for moving during counter-recoil movement of the bolt said rocker to a predetermined position to cause it to operate as a rammer for forcing another cartridge into said chamber.

6. In an automatic gun, a receiver, a barrel having a cartridge receiving chamber, supporting means for positioning a cartridge in a cradled position in the receiver, a cartridge deflector in said receiver, a bolt mounted for movement in recoil and counter-recoil, a rammer pivotally mounted upon the bolt, a spring for constantly urging the rammer away from its ramming position upon the bolt, cam actuated means for moving the rammer to a ramming position upon the bolt against the action of said spring in order to cause it as it is moved in counter-recoil to engage the rear end of said cartridge, and an abutment secured to the receiver and constructed and arranged to be engaged by the rammer to retain it against displacement from its ramming position on the bolt during a portion of the movement of said bolt in counter-recoil.

7. In an automatic gun, a bolt and a slider which are mounted for movement as a unit in recoil and counter-recoil and which have interengaging helical threads, said slider also being movable in recoil and counter-recoil relatively to the bolt to effect rotation of said bolt, a rocker which is pivotally mounted upon the bolt and operates alternately as a rammer and extractor, means responsive to movement of the slider in counter-recoil with relation to the bolt for securing the rocker in a fixed position upon the bolt in which position the rocker operates as an extractor, means responsive to deceleration of said slider during its movement in recoil for releasing the rocker for pivotal movement upon the bolt to permit it to operate as a rammer, and mechanism for moving the rocker on said bolt to a position in which it operates as a rammer.

8. In an automatic gun, a bolt and a slider which are mounted for movement in recoil and counter-recoil together as a unit and which have interengaging helical teeth, said slider also being movable in recoil and counter-recoil relatively to the bolt to cause it to effect rotation of the bolt, a rocker which is pivotally mounted upon the bolt and which operates alternately as a rammer and an extractor, means responsive to movement of the slider in counter-recoil with relation to the bolt for securing the rocker against rotation upon the bolt to cause said rocker to operate as an extractor during its successive movement in recoil, means responsive to deceleration of said slider during its movement in recoil for releasing the rocker for pivotal movement upon the bolt to permit it to operate as a rammer, and cam actuated means for moving the rocker to a ramming position upon the bolt during the first part of the movement of the slider and the bolt in counter-recoil.

9. In an automatic gun, a slider, a bolt threaded onto the slider for rotation about an axis, said slider and said bolt being mounted for movement as a unit in recoil and counter-recoil lengthwise of said axis and the slider also being mounted for movement lengthwise of said axis with relation to the bolt to effect rotation of said bolt about said axis, a rocker which is pivoted upon the bolt and operates alternately as an extractor and a rammer, a spring carried by the bolt for constantly urging the rocker toward its extracting position against a face of the bolt, means carried by the slider for locking the rocker in its extracting position upon the bolt, a reaction unit for limiting recoil movement of the slider and the bolt, said means being movable in response to engagement of the slider with said reaction unit to release said rocker for movement on the bolt in order to permit said rocker to be moved to a position in which it operates as a rammer, and mechanism for moving said released rocker to its ramming position.

10. In an automatic gun, a slider, a bolt mounted upon the slider, said slider and said bolt being constructed and arranged for movement as a unit in recoil and counter-recoil and said slider also being movable in recoil and counter-recoil with relation to the bolt to effect rotation of the bolt on the slider, a rocker which is pivotally mounted upon the bolt and is movable into one position to operate as an extractor and is movable into another position to operate as a rammer, a slide which is movable upon the slider in the general path of movement of the slider in recoil and counter-recoil, said slide being constructed and arranged to be engaged by the rocker when said bolt is rotated upon the slider to cause the rocker to be secured in an extracting position upon the bolt, said slide being movable upon the slider away from the rocker at a predetermined time to permit the rocker to be tilted to a ramming position upon the bolt, and mechanism for moving said released rocker to its ramming position.

11. In an automatic gun, a slider and a bolt movable in recoil and counter-recoil, a bolt lock, said bolt being threaded onto the slider for rotation about an axis to cause the bolt to be moved into interlocking relation with the bolt lock, a rocker which is pivotally mounted upon the bolt for movement into two different positions in which it operates alternately as an extractor and a rammer, a slide carried by and mounted for reciprocation upon the slider, said slide being constructed and arranged to lock the rocker to the bolt in a position in which it operates as an extractor while said bolt is being rotated upon the slider and during the first part of the recoil movement of the slider, said slide being operated for movement away from the rocker during the last part of the recoil movement of the slider and the bolt to release the rocker for movement to its ramming position on the bolt, and cam operated means for moving the rocker so released to its ramming position during the first part of the counter-recoil movement of the slider and the bolt.

References Cited in the file of this patent

UNITED STATES PATENTS

| | | |
|---|---|---|
| 147,945 | Keene | Feb. 24, 1874 |
| 172,448 | Keene | Jan. 18, 1876 |
| 710,411 | Bergmann | Oct. 7, 1902 |
| 813,802 | Johnson | Feb. 27, 1906 |
| 991,962 | Eastwick | May 9, 1911 |
| 1,007,911 | Bjorgum | Nov. 7, 1911 |
| 1,020,596 | Brauning | Mar. 19, 1912 |
| 1,077,873 | Dawson | Nov. 4, 1913 |
| 1,125,937 | Benet et al. | Jan. 26, 1915 |
| 1,128,180 | Orman | Feb. 9, 1915 |
| 1,317,587 | Mercie | Sept. 30, 1919 |
| 1,359,635 | Thompson | Nov. 23, 1920 |
| 1,365,355 | Thompson | Jan. 11, 1921 |
| 1,454,039 | Chevallier | May 8, 1923 |
| 1,828,329 | Loomis | Oct. 20, 1931 |
| 2,061,313 | Moore | Nov. 17, 1936 |
| 2,093,169 | Holek | Sept. 14, 1937 |
| 2,136,512 | Laloux | Nov. 15, 1938 |
| 2,146,185 | Holek | Feb. 7, 1939 |
| 2,146,743 | Johnson | Feb. 14, 1939 |
| 2,149,707 | Murbach | Mar. 7, 1939 |
| 2,313,030 | Tauschek | Mar. 2, 1943 |
| 2,359,517 | Gebeau | Oct. 3, 1944 |
| 2,436,937 | Rataiczak | Mar. 2, 1948 |
| 2,462,889 | Neidhardt | Mar. 1, 1949 |

FOREIGN PATENTS

| | | |
|---|---|---|
| 502,478 | France | Feb. 23, 1920 |
| 213,930 | Switzerland | June 16, 1941 |
| 117,523 | Australia | Sept. 15, 1943 |